United States Patent [19]

Sarukawa et al.

[11] Patent Number: 5,463,938
[45] Date of Patent: Nov. 7, 1995

[54] APPARATUS FOR POWDERING BATTER-COATED FOOD PIECES

[75] Inventors: Chuji Sarukawa, Machida; Sadaaki Ito; Hiromi Ito, both of Hachioji, all of Japan

[73] Assignee: Nippon Suisan Kabushiki Kaisha, Tokyo, Japan

[21] Appl. No.: 139,161

[22] Filed: Oct. 21, 1993

[30] Foreign Application Priority Data

Oct. 22, 1992 [JP] Japan .................... 4-308038

[51] Int. Cl.⁶ ........................................ A21C 9/04
[52] U.S. Cl. .................. 99/352; 99/443 C; 99/494; 99/516; 118/16
[58] Field of Search ................ 99/443 C, 494, 99/516, 534, 352, 404, 339, 357; 118/16, 20, 22

[56] References Cited

U.S. PATENT DOCUMENTS 3,647,189  3/1972  Johnson ..................... 118/16
3,703,382  11/1972  Harkey ..................... 118/16
3,967,583  7/1976  Booth ....................... 118/16
5,186,098  2/1993  Miller ....................... 99/494
5,238,493  8/1993  Miller ....................... 99/494

FOREIGN PATENT DOCUMENTS 54-59366  5/1979  Japan .
57-5651   1/1982  Japan .
59-23782  6/1984  Japan .

Primary Examiner—David Scherbel
Assistant Examiner—Reginald L. Alexander
Attorney, Agent, or Firm—Browdy and Neimark

[57] ABSTRACT

An apparatus for coating food frying pieces with grains powder includes a buttering conveyor of the string type carrying the food pieces through a steamer and under a batter nozzle that coats them before they drop off the end of the buttering conveyor onto a covering conveyor. The covering conveyor includes rotating urgers. A sieving conveyor, also of the string type, receives the pieces and conveys them to a next-stage output conveyor. A grains powder supply conveyor coupled to the stem portion of the covering conveyor and a grains powder recovery coveyor extend between the covering conveyor and the sieving conveyor.

22 Claims, 13 Drawing Sheets

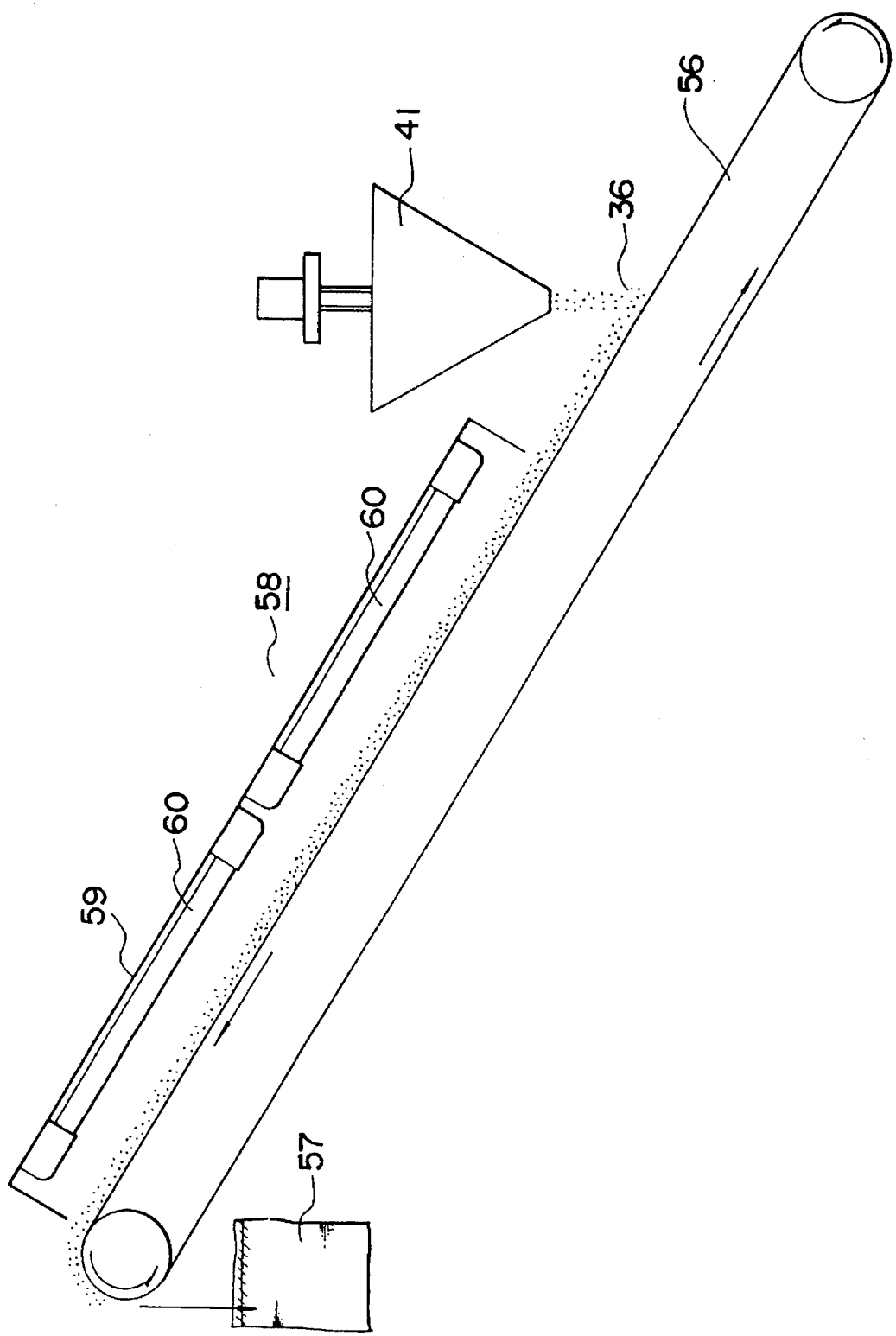

5,463,938

APPARATUS FOR POWDERING BATTER-COATED FOOD PIECES

FIELD OF THE INVENTION

This invention relates to a technique, in which food material for frying to produce such foods as fried shrinps is coated with batter, also referred to as butter, which is a milk-like dispersion of flour or the like, and then covered substantially over the entire surface with fluor or like grains powder to be ready for frying.

DESCRIPTION OF THE PRIOR ART

As our life becomes richer in both the quality and quantity, various novel forms of what we eat have appeared. There is thus an increasingly prospering trend for the processed food industries for providing frozen foods and like food semi-products, which can be used for efficient and ready home cooking by spending housewife's free time and omitting wasteful labor, as well as eat-out industries for providing first foods or the like. Nowadays, simplified foods are eaten in home, which are excellent in taste, rich in nutrition, sanitary, good-looking, satisfactory in cooking efficiency and readily capable of cooking.

These circumstances are reducing the time occupied by the housewife and the like for home cooking and promoting effective utility of the spare time.

Many of the frozen food materials are processed in factories or the like such that they can keep the taste of the commonly termed home dishes be quickly supplied to the dining table after simple heating in an electronic oven or the like. Widely distributed among processed food materials are such high class food materials as those for fried shrimps and fried crab portions. These food materials are commonly called fried food materials. They are produced from, for instance, shrimps or crab portions including only shelled portion and craws. In production, these raw materials are coated with butter, i.e., a milk-like dispersion of flour, and then the buttered surface is entirely covered with grains powder in the form of fine particles such as flour by light pressure application.

As for various fried foods like those noted above, there is recently a trend of switch from primitive form of supply after manual preparation over to stable supply of high quality foods which have been mass produced as standard goods in factories. Among the food processing techniques that have been developed are inventions disclosed in Japanese Patent Laid-Open Publication S54-59366, Japanese Patent Laid-Open Publication S57-5651 and Japanese Patent Publication S59-23782. Some of these techniques have already been used in practice after providing some improvements.

The fried food materials that are produced by mass production with conventional mechanical means or methods have merits of stable quality owing to their supply in large quantities in a sufficiently sanitary state and also inexpensive price compared to the fried foods that are provided by the primitive manual operation. However, the mass produced high class fried food materials such as those for fried shrimps and crab portions are liable to be inferior to those based on the manual operation in the softness to the tongue or like sense in the commonly termed soft taste which is very important when eating the foods. This deficiency particularly stems from the step of covering buttered food material surface with grains powder of fine particles such as flour. This step involves a step of forcibly covering the buttered food material with flour by urging the flour by squeezing the conveyer into a circular sectional profile with urging means such as an urging roller. In this step, the flour or the like can be reliably attached to the food material. However, as a result of this step a rigid food material like a rod or an ice candy is produced. When such food material is fried, there results spoiling of a rough or gritty appearance of the food surface with the flour attached thereto, which is obtainable by manual production of the food material. When this food is eaten, soft taste or deliciousness to the tongue can not be obtained, and only a hard or sandy sense of touch to the tongue is felt. Therefore, it is possible that the commercial value, favor and popularity as high class food are deteriorated.

Particularly, if uniform covering between the flour and butter fails to be obtained in the urging step, a commonly termed "black frying of butter" is produced in the cooking. This extremely deteriorates the taste and appearance as well as the sense of touch, and therefore the food can not be supplied to the table for visitors or for waiting.

In another aspect, before the raw material is buttered, it is heated by passing it through hot water to provide crab's shell and tail, for instance, with a reddish color and thus improve the appearance. In this case, however, the commonly termed delicious content, which is soluble to water, is dissolved from the shelled portion.

An a further aspect, in the factory production of the fried food materials as noted above the raw food material, after being buttered, is covered with flour evenly over the entire surface on a belt conveyer, as is well known in the art. Thus, covered food material which can eventually provide a sense of touch close to that obtainable in the case of the manual production, is supplied to the next freezing step. At this time, the cover powder that is separated from the covered food material is subjected to a sieving step to separate commonly termed lamps, which are produced in the covering step carried out after buttering, and grains powder such as flour, and the separated powder is recovered for effective re-use.

If lamps are conveyed together with the food material and attached to the semi-product, a very different sense of touch to the tongue and teeth, that is, a different sense of eating, is produced to reduce the value of fried food when the food is eaten.

Further, if the separation of the flour and the lamps is insufficient, lamps or crushed particles thereof occur in the flour which is recovered for re-use. In this case, in the step of covering the buttered food material with flour, it is liable that the flour is given moisture, thus impeding the normal covering. Moreover, in the recirculation step the introduced moisture is liable to absorb dust or bacteria in the atmosphere.

The flour or like grains powder and lamps are separated basically with a belt conveyer, which conveys only the lamps, while the flour is via a receiving belt conveyer and a returning belt conveyer to the covering step. The separation of the flour and the lamps with the belt conveyer is very important. With a flat belt conveyer, however, the flour and the lamps can not be separated reliably. Accordingly, a sieving device has been developed and used in practice, which comprises a large number of string belt conveyers stretched at a predetermined interval are driven for excursion past a drive and a driven roller for conveying lamps, while feeding back flour that has been separated from the lamps on a lower flat belt conveyer.

However, with this type of the prior art sieving device the interval between adjacent string belt conveyers is fixed, and also the speed of rotation of the drive roller is fixed. Therefore, the conveying speed and interval of the individual belt conveyers are fixed, and large lamps are fed back although they are conveyed, thus giving rise to undesired phenomena.

SUMMARY OF THE INVENTION

The present invention seeks to solve technical problems inherent in fried food materials for fried shrimps and crab portions produced in the above prior art techniques, for instance the flow-out of the delicious content and also problems concerning the buttering, covering and sieving, and its object is to provide an excellent method of covering fried food material, which permits soft taste of high class foods to be provided sanitarily and without spoiling the appearance and softness to the tongue that are obtainable by manual preparation while providing advantages of the steady, large quantity supply of highly reliable, high and stable quality foods based on mechanical processing, thus being beneficial to the fields utilizing food processing techniques in the distribution industry, and an apparatus which can be used directly for the same method.

The technical means and functions of the invention of the present application attain the above object are as follows. As the raw material are used half-product materials for fried shrimps or crab portions. The material comprise a tail portion or a portion with a shell and a shelled portion. The material is supplied on a buttering conveyer, for instance string conveyers. At this time, it is passed through a steamer for thermal sterilization, while preventing the dissolution of the water-soluble delicious content from the shelled portion. Then, only the shelled portion is coated entirely and uniformly in thickness with butter, which is supplied by a disk pump connected by a shoot to a buttering tank and through a nozzle of a buttering tank. Excess butter is recovered by making use of its viscosity, specifically via a string conveyer and a receiving shoot, in the battering tank for re-use. To the end of the buttering conveyer is coupled a covering converyer, which is adapted such that no butter enters it and that commonly termed lamps are not formed. Buttered material is thrown onto an end of the covering conveyer such that it is parallel to the direction of progress of the buttering conveyer, and it proceeds therewith while receiving an effect of covering it with flour or like grains powder by light pressure application. While the material proceeds along the covering conveyer, it is covered entirely and softly with flour or like grains powder in a rough or gritty state just like it is covered with application of light pressure by manual operation. This is done by urging rollers as urging means from the sides of the covering conveyer and upper developing rollers made from rubber tubes or the like. In this covering process, the material is entirely and reliably covered with flour or like grains powder to a rough state by a light, soft and reliable urging action of the developing roller. The work system is then supplied from the end of the covering conveyer to a sieving conveyer comprising a string conveyer. Thus, excess grains powder is separated from the covered food material and lamps to be recovered by the string conveyer. During this process, the amount or level of grains powder on the covering conveyer is detected continuously by a level sensor which is provided at such a position as between adjacent developing rollers. If the level of grains powder such as flour is reduced, a damper of a hopper which is provided in the recovering area is opened to replenish with only a predetermined amount of powder. Thus, a predetermined amount of powder is retained on the covering conveyer at all times to ensure stable covering of the material. Further, in the grains powder recovery excursion process, the powder is sterilized by sterilizing lamps or the like provided at the stem or the end of the covering conveyer, thus maintaining the sanitary state. The covered fried food material that has been conveyed on the sieving conveyer is transferred to a next stage twisting conveyer such as a string conveyer. On this conveyer, the work is rotated sidewise at least once, whereby uniform complete finish covering is obtained without exposure of butter between adjacent grains powder particles, thus elevating the reliability of the product. The work is then transferred to a next stage conveyer to be conveyed to a freezing step or the like.

BRIEF DESCRIPTION OF THE DRAWINGS

The above and other objects in the nature and advantages of the present invention will become more apparent from the following detailed description of an embodiment taken in conjunction with the drawings wherein:

FIG. 23 is a sectional view showing a sterilizing unit in the same embodiment.

DESCRIPTION OF THE PREFERRED EMBODIMENT

Figure 1:
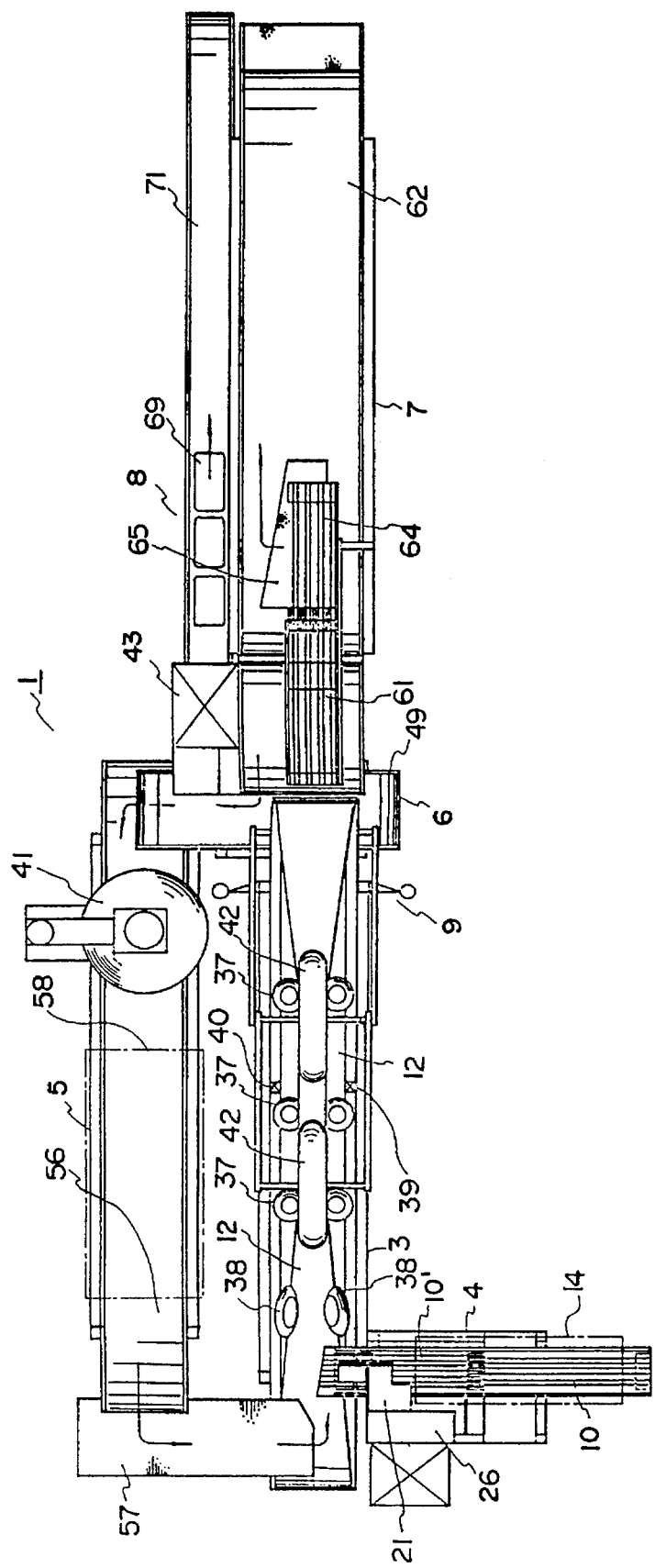
FIG. 1 is a schematic plan view showing an embodiment.
Figure 2:
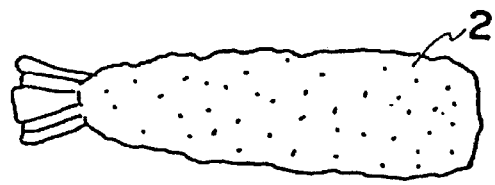
FIG. 2 is a plan view showing fried food concerning the same embodiment.
Figure 3:
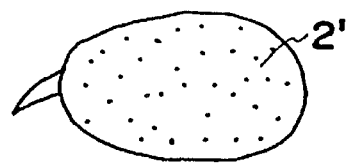
FIG. 3 is a plan view showing fried food concerning the same embodiment.

Referring to FIG. 1, designated generally at 1 is an apparatus for forming grains powder covering of food material for frying, which is a gist of the invention of the present application. The apparatus is used for buttering and covering raw food material to produce frozen food material, which may be readily fried by a housewife in home to prepare a fried shrimp 2 as shown in FIG. 2 or fried crab portion 2' as shown in FIG. 3. The apparatus comprises a longitudinally and centrally extending covering section 3, a buttering section 4 coupled to the stem of the covering section 3, a grain powder recovery/supply section 5 of excursion type provided on the side opposite the buttering section 4, a sieving section 6 provided at the forward end of the covering section 3, a finishing section 7 provided at the forward end of the sieving section 6, and a packaging section 8 provided on one side of the finishing section 7. In view of the maintenance and inspection, these sections are capable of disassembling and reassembling with universal rollers 9.

Figure 4:
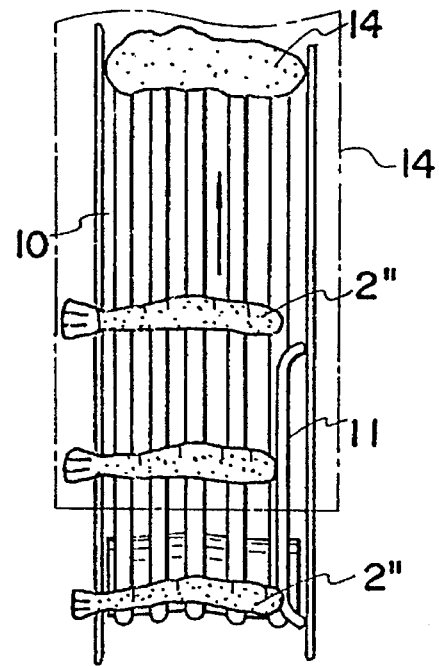
FIG. 4 is a schematic plan view showing a material supply section and a streamer in a buttering conveyer in the same embodiment.
Figure 6:
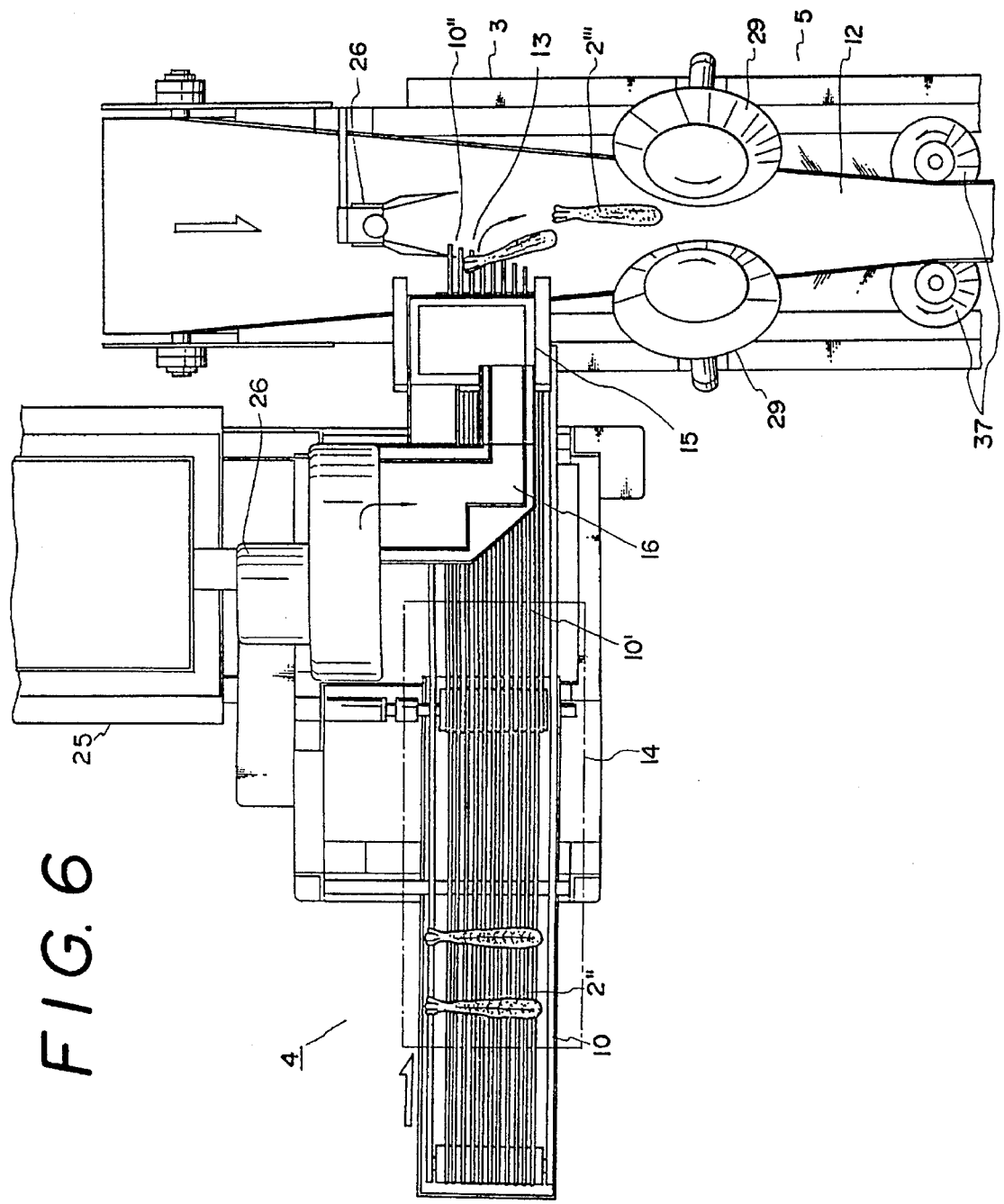
FIG. 6 is an enlarged-scale plan view showing the buttering conveyer and a covering conveyer in the same embodiment.
Figure 7:
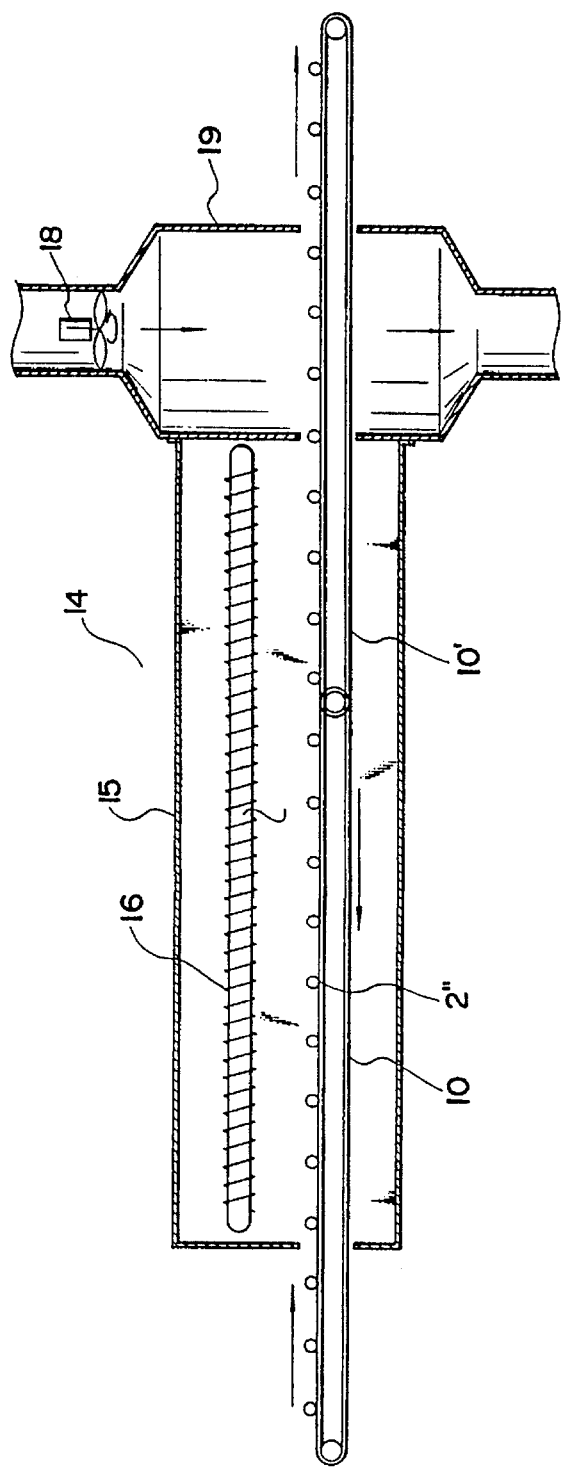
FIG. 7 is a schematic sectional view showing the steamer in the same embodiment.
Figure 8:
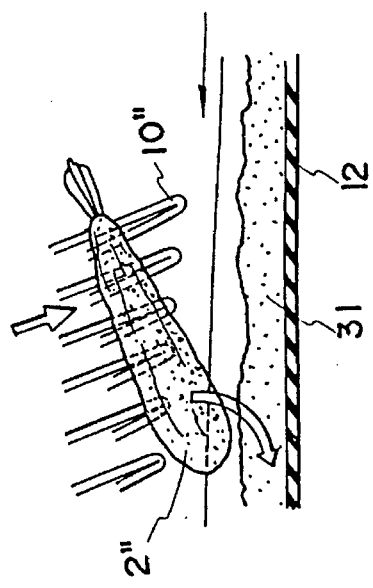
FIG. 8 is a fragmentary side sectional view showing a material transferred from an end of the buttering conveyer to the covering conveyer in the same embodiment.
Figure 9:
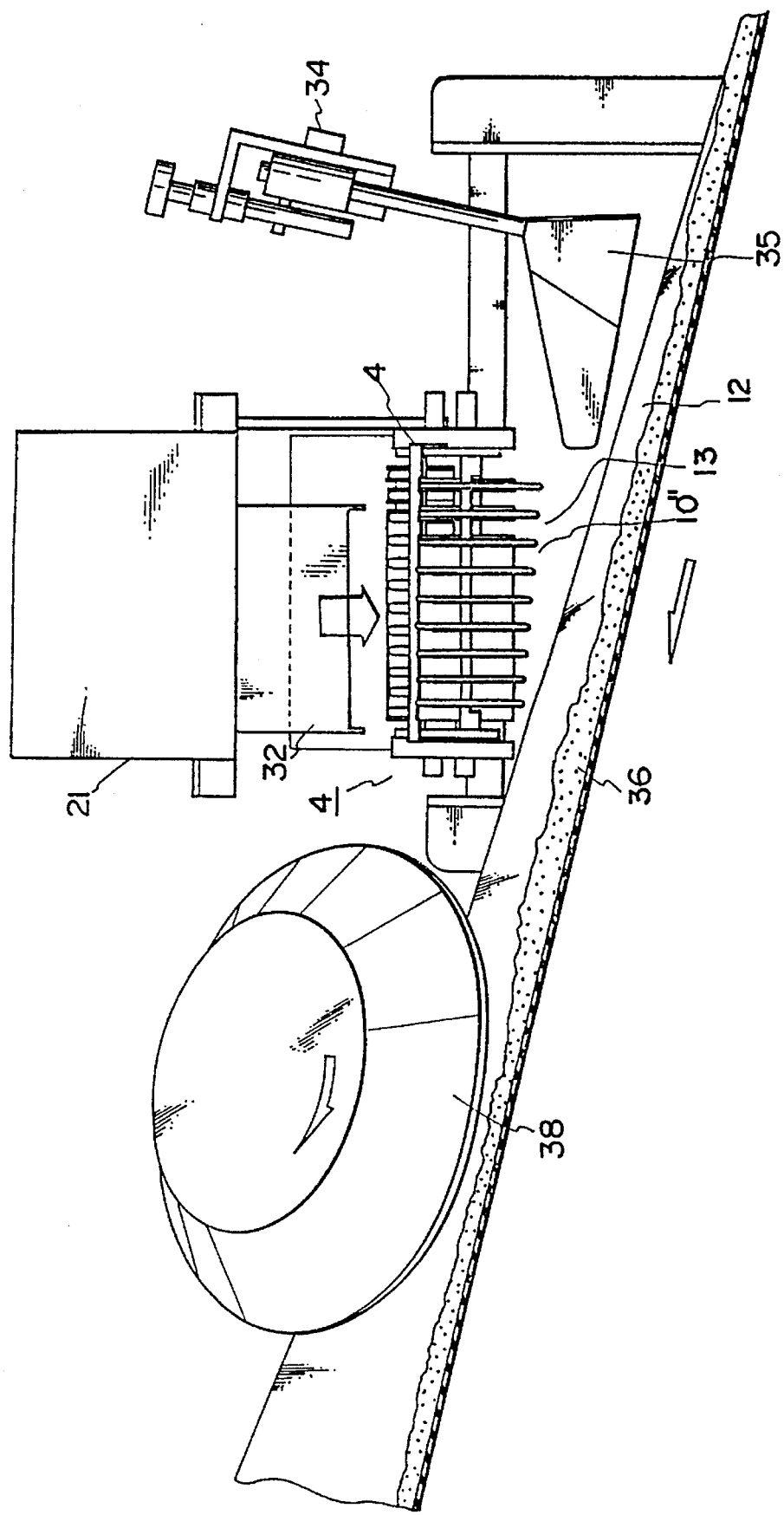
FIG. 9 is a fragmentary enlarged-scale side view showing the buttering conveyer and covering conveyer in the same embodiment.

These sections will now be described one after another in connection with an embodiment applied to row material for fried shrimps. The buttering section 4, as shown in FIG. 6, comprises longitudinally three stage buttering conveyers 10, 10' and 10", which may be string conveyers. In this embodiment, as shown in FIG. 4, shelled material pieces 2" with tail for fried shrimps are conveyed at a predetermined interval and in a transversal posture at right angles to the string conveyer 10" with their head moved along a bar-like guide 11. As shown in FIGS. 6 and 9, the forward end of the third stage string conveyer 10" is found on a covering conveyer 12 of flat belt type. The end 13 is inclined with respect to the direction of progress of the covering conveyer 12 in plan view and in side view, as shown in FIGS. 6 and 8 to 11. As shown in FIG. 8, the material 2" falls onto the covering conveyer 12 with its head first and then its tail to be conveyed in a posture parallel to the direction of progress of the conveyer 12.

As shown in FIGS. 1, 4, 6 and 7, a steamer 14 is provided, which has an overhanging casing 15 covering the top and opposite sides of the first and second stage string conveyers 10 and 10'. Through the casing 15 a steam pipe 17 with a spiral fin 16 extends longitudinally, and it is connected to a boiler (not shown) via a valve for predetermined pressure adjustment or the like. The introduced material 2" is thermally sterilized, while preventing the emission of the water-soluble delicious content from the material 2".

The forward end of the casing 15 is provided with a cooling hood 1, which extends vertically and has a cooling fan 18 for preventing overheating by supplying cold air upward.

Figure 5:
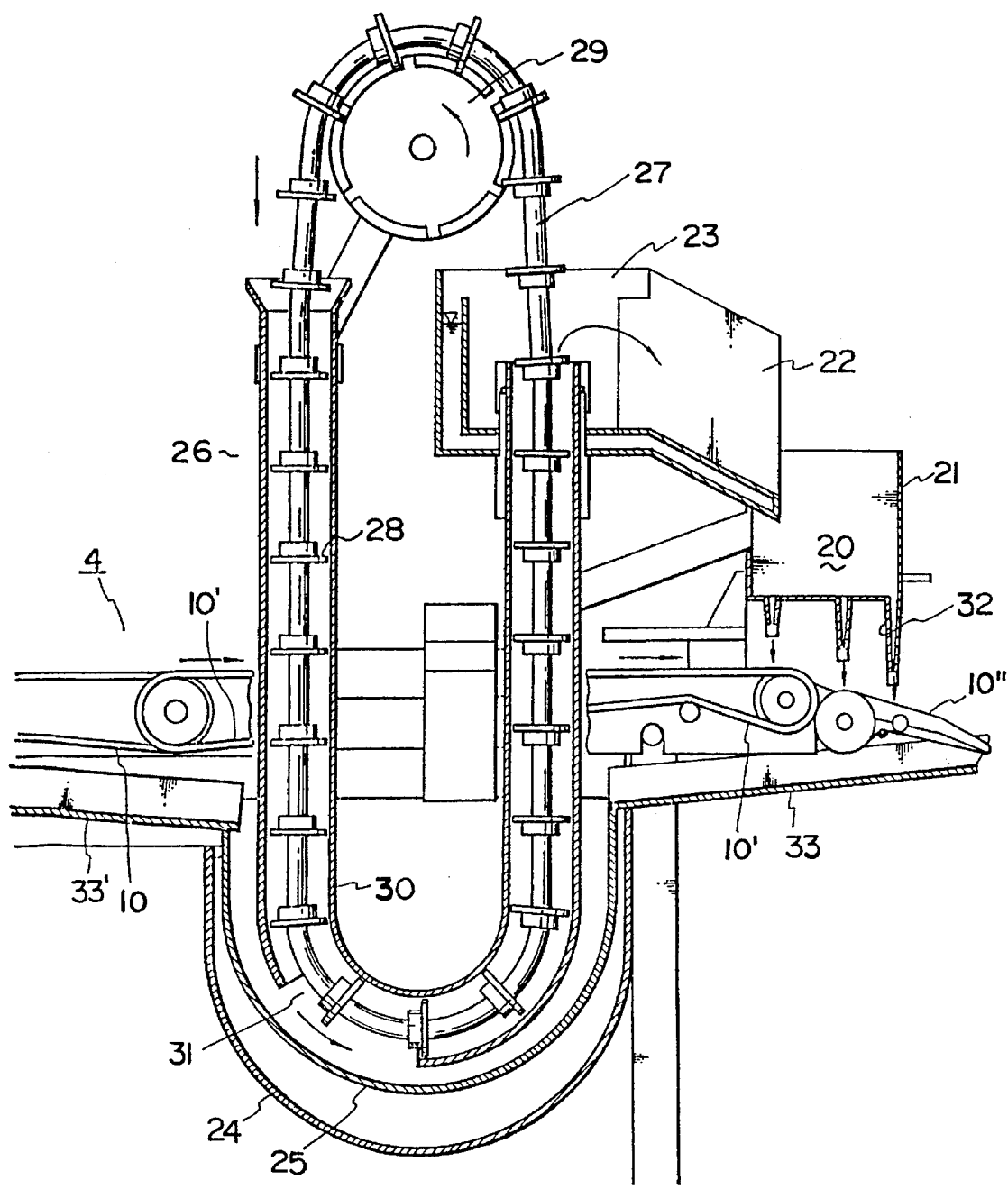
FIG. 5 is a side sectional view showing a buttering tank and a disk pump in the same embodiment.
Figure 11:
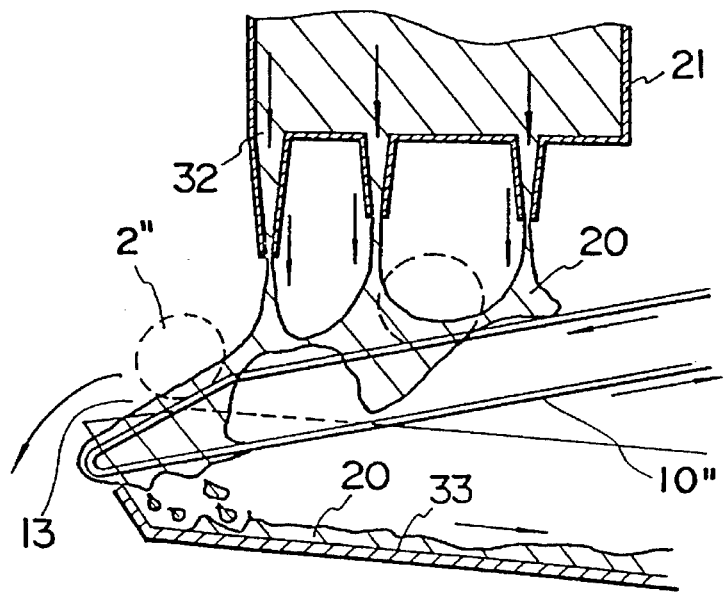
FIG. 11 is a side sectional view of the same embodiment.

As shown in FIG. 5, a buttering hopper 21 with butter 20 stored therein is provided above the third stage buttering conveyer 10", and it is coupled to a buttering tank 23 via a shoot 22. The buttering tank 23 is coupled via a multi-disk pump 26 to a surge tank 25 with a cooling jacket 24 for surging butter 20. The multi-disk pump 26 has a plurality of pumping disks 28, which are radially integral with a flexible hose 27 and spaced apart at a predetermined interval. These pumping disks 28 are circulated past a sprocket 29 by a motor (not shown). Butter 20 which has been cooled is pumped from a suction port 31 provided in a guide 30 in the surge tank 25 to be supplied via the buttering tank 23 and shoot 22 to the buttering hopper 21. Butter 20 is thus supplied in the form of a depending film, as shown in FIG. 11, owing to its predetermined viscosity and the gravitational force from a predetermined number of slit-like nozzles 32 in such a form as to traverse the buttering conveyer 10", as shown in FIG. 11. The material pieces 2", i.e., shelled portions thereof, being conveyed in the transversal posture from the buttering conveyer 10" and having been thermally sterilized in the steamer 14 while prevented from the emission of the delicious content, is subjected to buttering over the entire front and back sides and with a uniform thickness.

Figure 10:
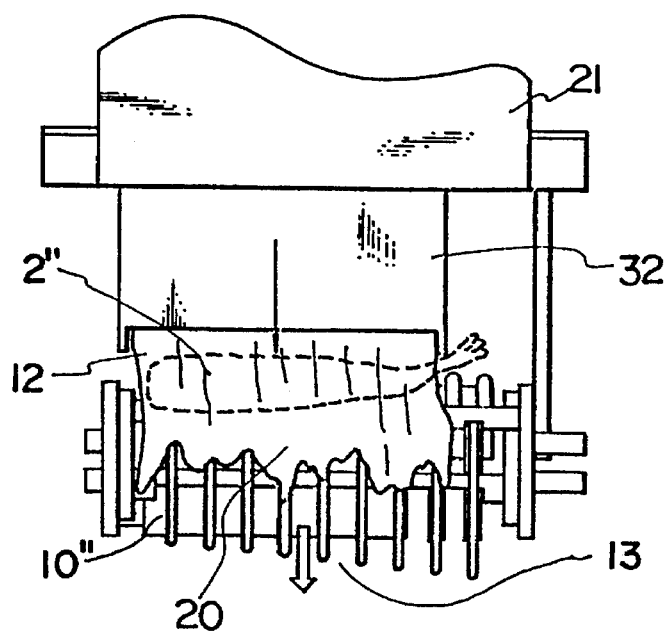
FIG. 10 is a side view showing a falling state of butter at an end of the buttering conveyer in the same embodiment.

Since butter 20 has a predetermined viscosity, as shown in FIG. 11, as it falls from the nozzles 32, it is supplied to the entire width of the buttering conveyer 10" and also to a portion underneath. Thus, the shelled portion of the material 2" is buttered reliably and entirely. Further, as shown in FIGS. 10 and 11, the run of the buttering conveyer 10" is sharply turned back round a transversal pin at its end. Since butter 20 has a predetermined viscosity as noted above, its portion which has not been used for the buttering is returned owing to its viscosity to the surge tank 25 via a receiving shoot 33 provided beneath the buttering conveyer 10", as shown in FIG. 5.

Butter 20 may be occasionally attached to and retreated with the second buttering conveyer 10'. Thus butter 20 falls onto another receiving shoot 33', as shown in FIG. 5, to be returned to the surge tank 25.

As shown in FIGS. 10 and 11, butter is returned from the buttering conveyer 10" in the buttering section 4 to the surge tank 25 in a state that it is attached to the buttering conveyer 10". That is, it does not fall onto flour 36 on the covering conveyer 12. Thus, commonly termed lamps are neither produced nor circulated.

In the covering section 3, the covering conveyer 12, which is a flat belt conveyer for conveying flour in the longitudinal direction, is stretched between a drive and a driven roller by a transmission (not shown) for endless excursion at a predetermined speed. As shown in FIG. 9, a stem portion of the covering conveyer 12 right before the intersection thereof with the buttering conveyer 10", is provided with a divider 35 via a frame holder 34. The divider 35 serves to uniformly distribute and spread flour 36 as grains powder in the width direction at the supply end.

Figure 14:
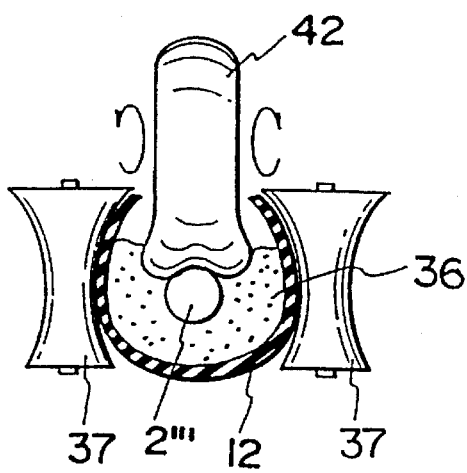
FIG. 14 is a fragmentary elevational sectional view showing the same developing roller.

As shown in FIGS. 1, 6 and 14, substantially in an intermediate portion of the covering conveyer 12 three stage pairs of crown-like urging rollers 37 are provided at a predetermined span and as an urger as a whole such that they are rotatable vertically. Further, as shown in FIG. 14, the covering conveyer 12, which is stretched such that it has a flat sectional profile at the opposite ends, is gradually squeezed into a substantially U- or V-shaped sectional profile from the opposite sides. Thus, the buttered food material 2" for frying can be reliably covered with flour 36 from the opposite sides over its entire surface.

As shown in FIGS. 1, 6 and 9, a left and a right flour gathering disk 38 are pivotally provided between the first stage urging rollers 37 and the buttering conveyer 10" such that they are in contact in a state of inclination by a predetermined angle with and rotated by friction with the inner surface of the covering conveyer 12. They have adjusting functions to permit optimum action of covering the shelled portion of the material 2''' for frying with flour 36 by light pressure application at a position downstream the urging rollers 37 and also prevent vortex flow of flour 36. They are disposed on the inner side of each edge of the covering conveyer 12.

As shown in FIG. 1, a pair of level sensors 39 and 40, which are well-known photoelectric sensors, are provided on a frame portion between the second and third stage ones of the three stage urging rollers 37 of the covering conveyer 12 such that they face each other on the opposite sides of the frame. They serve to detect the amount or level of flour 36 as grains powder on the covering conveyer 12 from the deposited amount of powder, and they can automatically adjust the amount of flour 36 supplied from a flour hopper 41 to be described later to an optimum amount.

Figure 13:
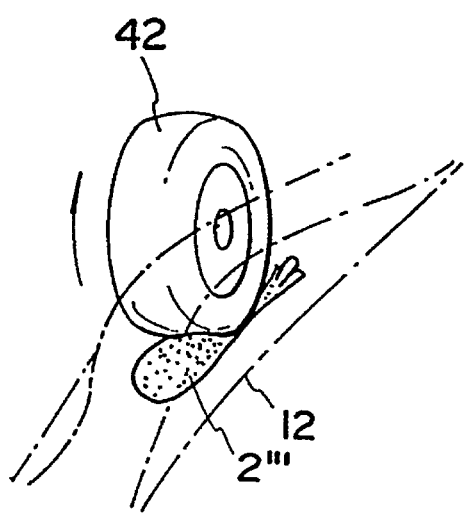
FIG. 13 is a perspective view showing a developing roller and a material in the same embodiment.

As shown in FIGS. 1 and 4, a pair of developing rollers 42 made from rubber tubes are provided such that they extend one after another in the longitudinal direction of the covering conveyer 12 between the opposite side urging rollers 37 of the three pairs thereof, that is, between the opposite side inner surfaces of the covering conveyer 12 which is squeezed from the opposite sides, such that they are rotatable about their shafts (not shown). As shown in FIGS. 13 and 14, each developing roller 42 applies a predetermined light pressure from above to the material 2''' which is pressure application covered with flour 36 in an overhanging fashion from the opposite sides by the covering conveyer 12. A commonly termed rough or gritty state of flour 36 is thus produced. Lest this state should be spoiled, urging pressures are applied to the material 2''' from above and below and also from the opposite sides in addition to the reaction force from below. Thus, the entire surface of the material 2''', that is, the portion thereof other than the tail portion which has been thermally made reddish, is entirely and uniformly covered with fluor 36 in cooperation with applied to it from the opposite sides by the squeezing covering conveyer 12.

Each developing roller 42 has its hollow inside filled with a predetermined quantity of water or air and further with a weight of a metal or a resin having a predetermined shape such as a ball of a predetermined size. With this structure, it is disposed rotatably so that it can effect pressure application covering of the shelled portion of the material with flour 36 to provide for a soft feel to the tongue just like that obtainable by the conventional manual operation of pressure application covering with flour.

As shown in FIG. 1, at the forward end of the covering conveyer 12, the sieving section 6 and a return conveyer 43 perpendicular thereto are provided.

Figure 18:
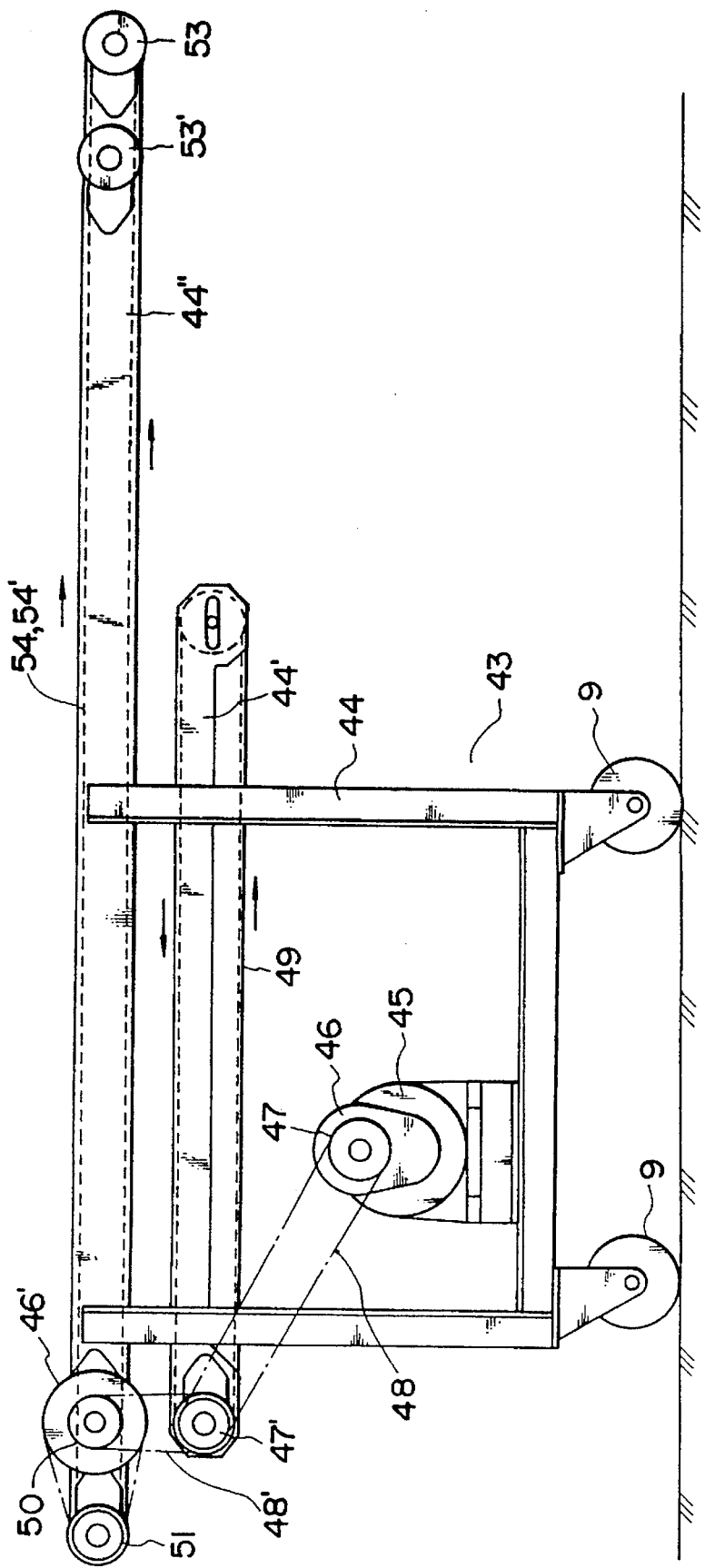
FIG. 18 is a side view showing a returning conveyer in the same embodiment.

As shown in FIG. 18, in the return conveyer 43 the frame 44 thereof is movable over the base via universal rollers 9. For torque transmission, a chain 48 is passed round a sprocket 47, which is provided on a motor 45 of a driver via a speed reduction unit 46, and a sprocket 47' provided on a front part of a sub-frame 44'. A receiving belt conveyer 49, which is a flat belt conveyer for conveying the fed-back flour 36 for re-use, is passed round a drive roller provided on the sprocket 47' and a rearward driven roller.

Figure 19:
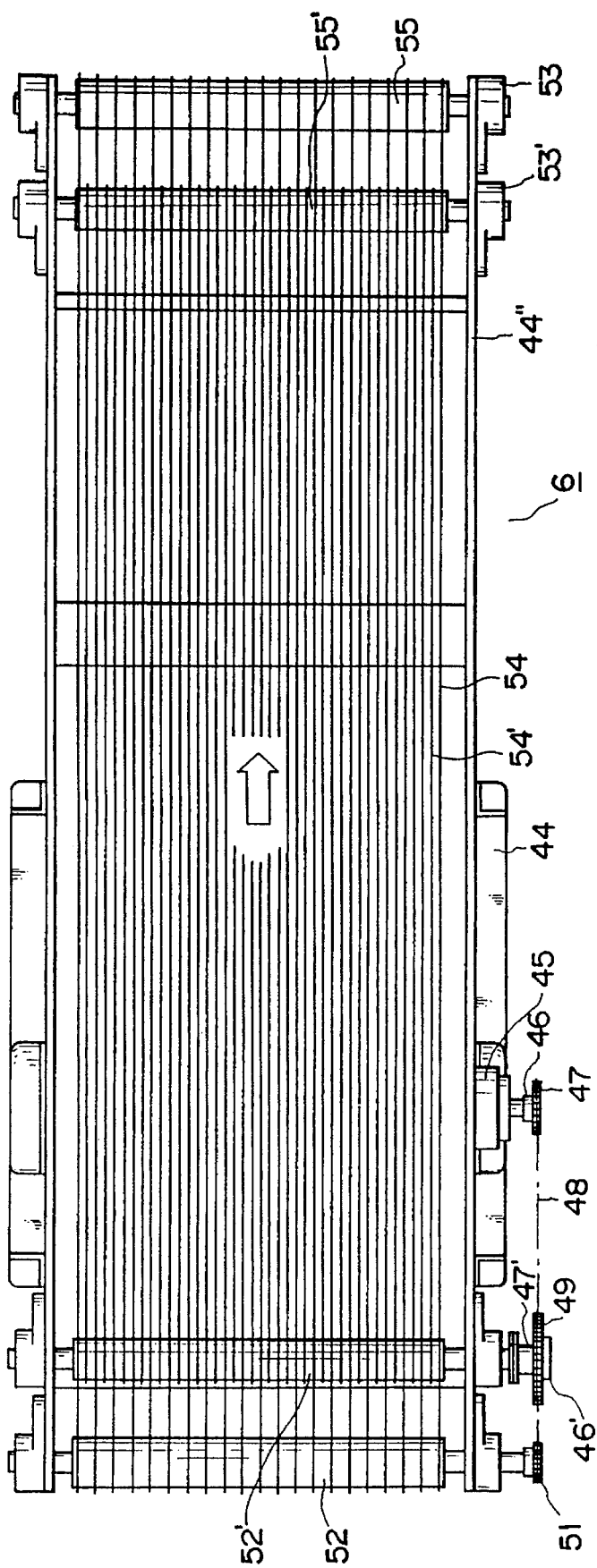
FIG. 19 is a plan view of the same embodiment.
Figure 20:
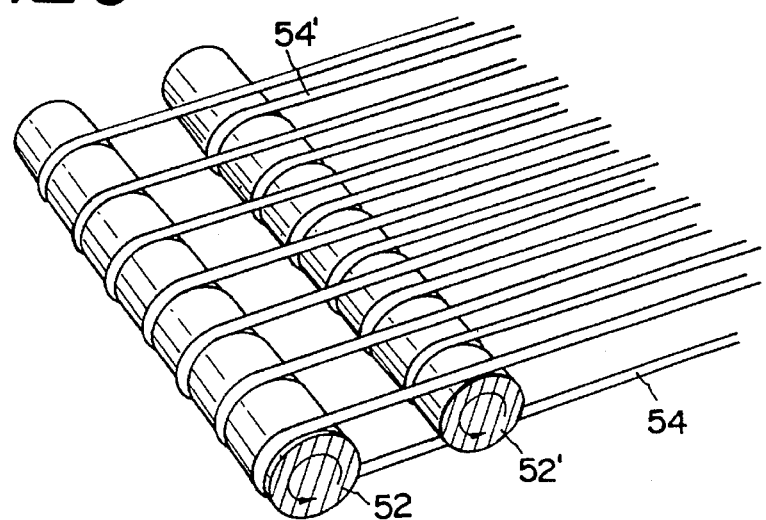
FIG. 20 is a fragmentary enlarged-scale perspective view showing the same embodiment.
Figure 21:
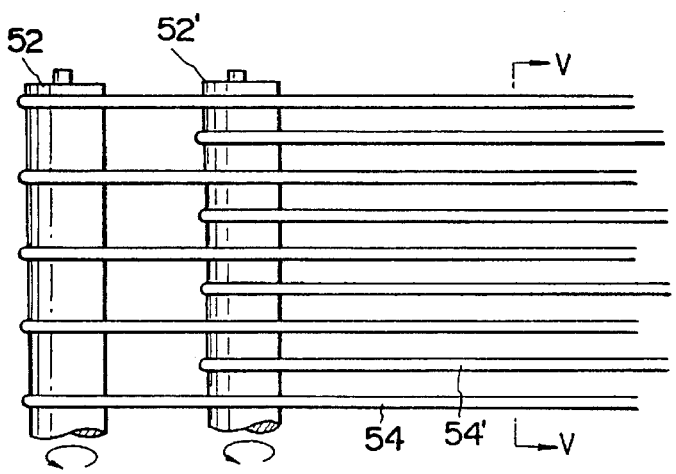
FIG. 21 is a fragmentary enlarged-scale plan view showing the same embodiment.

Above the sub-frame 44' another sub-frame 44'' is provided such that it is assembled with the frame 44. The lower sub-frame 44' has a sprocket 47', which is coupled by a chain 48' to a sprocket 50 provided on a front speed reduction unit 46'. A front portion of the sub-frame 44'' is provided with a sprocket 51 coupled via a chain to the speed reduction unit 46'. As shown in FIG. 19, the sprockets 50 and 51 are provided with respective transversal parallel rollers 52' and 52, which are rotated at different predetermined peripheral speeds.

A rear portion of the sub-frame 44'' is provided with bearings 53 and 53' supporting drive rollers 55 and 55'. Between these rollers 55 and 55' on one hand and the drive rollers 521 and 52 on the other hand are stretched alternate circular string belt conveyers 54 and 54' of the same sectional size. More specifically, the string belt conveyers 54' are passed round the inner drive and driven rollers 52' and 55', while the string belt conveyers 54 are passed round the drive and driven rollers 52 and 55. These string belt conveyers 54 and 54' have the same to conveying surface level. In this embodiment, a speed reduction unit 46' having a predetermined gear ratio is provided to let the set of the string belt conveyers 54' between the drive and driven rollers 52' and 55' run at a low speed and the set of the string belt conveyers 54 between the drive and driven rollers 52 and 55 run at a high speed at a predetermined ratio.

Thus, in plan view the high and low speed string belt conveyers 54 and 54' extent in alternate parallel arrangement between the drive and driven rollers 52' and 55'.

Figure 22:
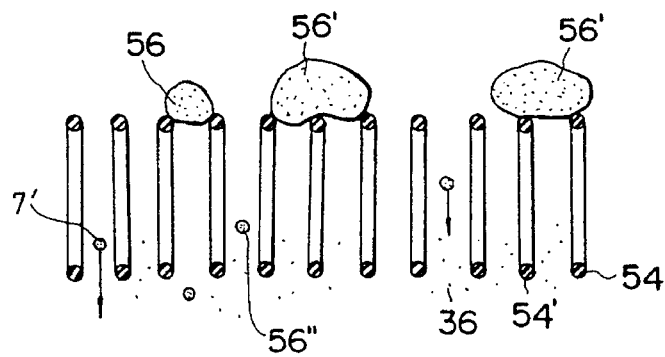
FIG. 22 is a fragmentary enlarged-scale front view showing the same embodiment.

When viewed in the transversal direction, each string belt conveyer 54 (or 54') is moving forward at a different relative speed from the other string belt conveyers 54' (or 54) on the opposite sides. The individual string belts 54 and 54' are uniformly spaced apart in plan view. As shown in FIG. 22, lamps 56 and 56' greater than a predetermined intermediate lamp size are fed forward while being rotated in plan view. Thus, the lamps 56 and 56' are not coupled together, and collectable flour 36 between them are allowed to fall.

As shown in FIG. 22, small lamps 56'' smaller than a size capable of recovery and re-use, are substantially the same as the flour 36. Since the individual string belt conveyers 54 and 54' of the conveying surface are uniformly spaced apart, small lamps 56' fall while they are fed and crushed with the impact force of falling. The large lamps 56 and 56' greater than a predetermined size are reliably fed forward without being crushed to be recovered in a hopper (not shown) which is disposed upstream the receiving belt conveyer 49, while the falling flour 36 and particles resulting from the crushing of the small lamps 56'' are fed forward by the receiving belt conveyer 49.

The receiving belt conveyer 49, the grains powder supply conveyer 56 and the shoot 57 ahead thereof are disposed such that they partly overlap one another in a channel-shaped arrangement and form a closed loop arrangement with the covering conveyer 12. With this arrangement, only the flour 36 that has been separated from the material 2''' is circulated to be supplied to the covering conveyer 12 again by making effective use of the covering action. A damper (not shown) of the flour hopper 41, which is provided at a predetermined position of the grains powder supply conveyer 56, is electrically on-off controlled in response to the detection of the mount of flour 36 present on the covering conveyer 12 by the level sensors 39 and 40, which are electrically connected to a controller (not shown). Thus, flour 36 is supplied on the covering conveyer 12 in a fixed adjusted amount at all times, thus ensuring sufficient and reliable pressure application covering action with respect to the material 2'''.

As shown in FIG. 23, a sterilizing unit 58 is disposed at a predetermined position of the grains powder supply conveyer 56. The sterilizing unit 58 has a casing 59. Sterilizing lamps 60 provided in the casing 59 reliably sterilize various bacteria contained in the flour 36 supplied from the hopper 41. The flour 36 is thus held sanitary in the covering process.

Figure 12:
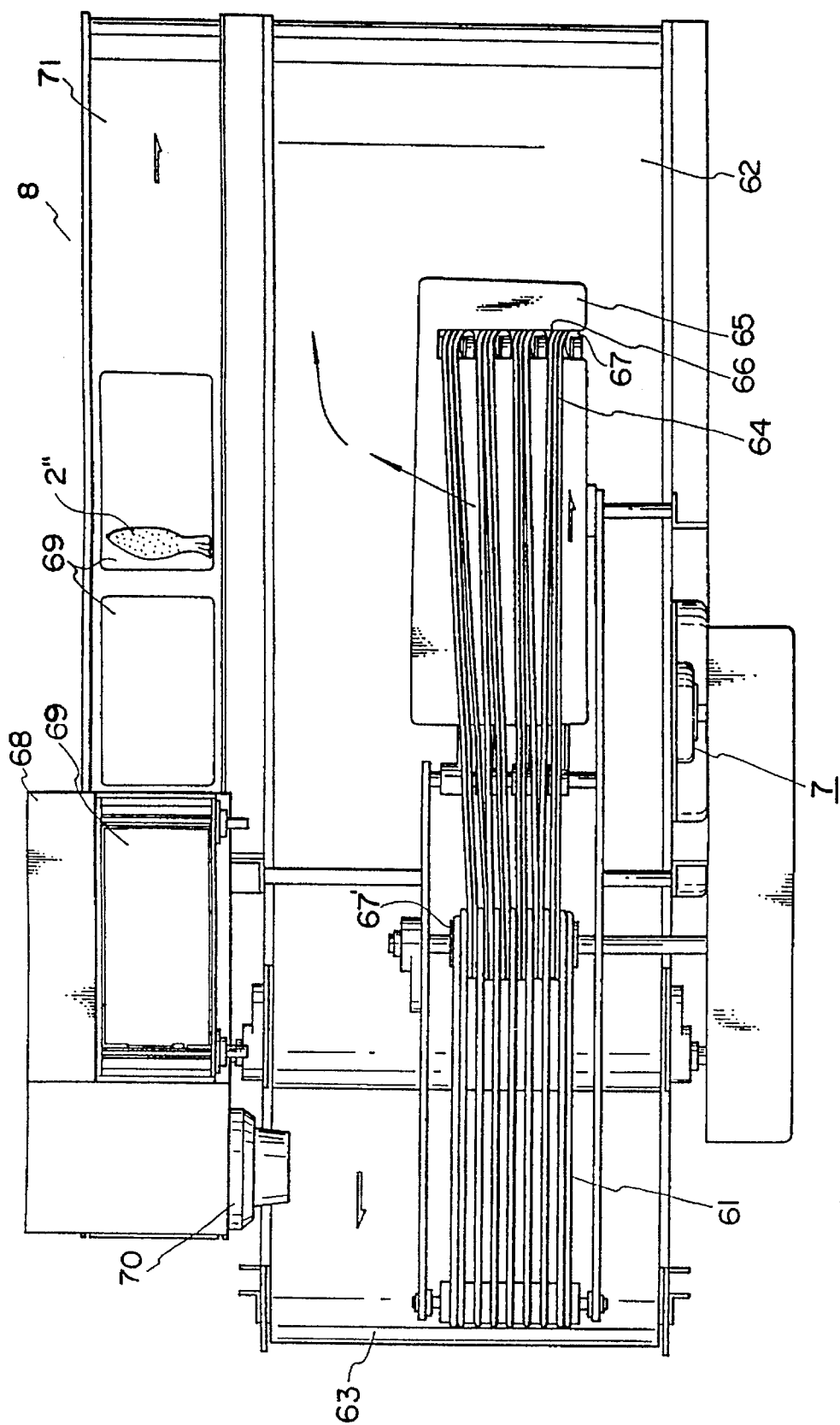
FIG. 12 is an enlarged-scale plan view showing a finishing section and a packaging section in the same embodiment.

In the final stage finishing section 7, as shown in FIG. 12, the sieving conveyer 61 is coupled as a string conveyer to the start end of the next stage conveyer 62 in a fashion of partial overlap in side view. The receiving belt conveyer 63 which is a flat belt conveyer 63 of reverse feeding type, is disposed beneath the sieving conveyer 61 and next stage conveyer 62 which is again a flat belt conveyer. Its downstream end portion extends over the receiving belt conveyer 49 of the returning conveyer 43. The flour 36 which has been separated form the food material 2''' for frying is thus circulated from the sieving conveyer 61 via the grains powder supply conveyer 56 and shoot 57 to be returned to the covering conveyer 12 for effective re-use.

Figure 15:
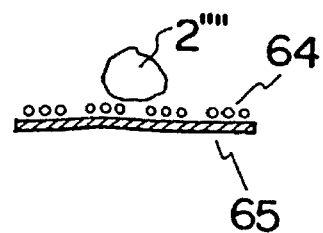
FIG. 15 is a sectional view showing a posture of food material for frying on a twisting conveyer in a sidewise turning process in the same embodiment.
Figure 16:
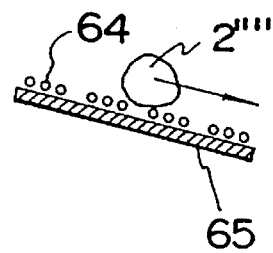
FIG. 16 is a sectional view showing a posture of food material for frying on a twisting conveyer in a sidewise turning process in the same embodiment.
Figure 17:
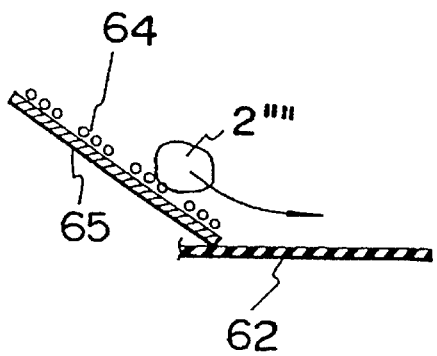
FIG. 17 is a sectional view showing a posture of food material for frying on a twisting conveyer in a sidewise turning process in the same embodiment.

As shown in FIG. 12, the food material 2" for frying having been separated by the sieving conveyer 61 is transferred to the next stage twisting conveyer 64 of string conveyer type. The twisting conveyer 64 is passed round a drive and a driven pulley 67 and 67'. The drive pulley 67 extends along a transversal slit 66 formed in an upstream end portion of a twisting plate 65, which is twisted such that its left side angle increases progressively in the direction of progress from the downstream to the upstream end. The underside of the forward run of the twisting conveyer 64 is in contact with the twisting plate 65. Thus, as shown in FIGS. 15 to 17, the food material 2" for frying is thus given a leftward twist by the progressively increasing downward inclination of the twisting conveyer 64 to the left side of the direction of progress. The covered food material 2" for frying is given a leftwardly inclining force as it proceeds in the longitudinal direction. Consequently, as shown in FIGS. 15 to 17, the material 2" is rotated at least once to the left to fall onto the next stage conveyer 62 for further conveying. Up to this time, the food material 2" for frying having been entirely covered with flour 36 by the urging and developing rollers 37 and 42, rolls to the left, and thus it receives a pressure application covering action over its entire surface. That is, the flour 36 that has been attached to the butter 20 on the material 2" is made to form a more uniform layer such as to eliminate exposed butter 20 for eliminating the blackening or like discoloring in home cooking by heating or the like.

In the packaging section 8 which extends along one side of the finishing section 7, a predetermined number of trays 69 which are stacked in an automatic tray feeder disposed near the stem part of the section 8, is supplied one after another by a motor 70 to a conveyer 71 which is undergoing excursion at the same speed as the conveyer 62. Food material pieces 2" for frying that have been turned individually by the twisting conveyer 64 and are conveyed in the vicinity of the conveyer 71 are thus progressively and neatly put on individual trays 69 for being conveyed to the next freezing step.

When covering the food material 2 for fried food such as fried shrimps with flour 36 or like grains powder in the covering apparatus 1 having the above construction, all the sections are operated via a control panel (not shown) provided in the apparatus. Specifically, a predetermined amount of flour 36 is supplied uniformly from the flour hopper 41 to the covering conveyer 12. Also, a predetermined amount of butter 20 is supplied to the surge tank 25 in the buttering section 4, and it is fed by the disk pump 26 through the buttering tank 23 and shoot 22 to be discharged from the nozzles 32 of the buttering hopper 21 in the form of a depending film to the buttering conveyer 10", as shown in FIGS. 10 and 11. Material pieces 2" having been previously processed are also supplied at a predetermined interval and in a posture perpendicular to the buttering conveyer 10 via the guide thereto, as shown in FIG. 4. The individual material pieces 2" are thus conveyed forward on the buttering conveyers 10 and 10'. While they are conveyed, they are thermally sterilized in the steamer 14. At this time, they are prevented from the flow-out of the water-soluble delicious content in their shelled meat portion, and thus deterioration of their taste is avoided. In the buttering conveyer 10" they encounter the falling film of butter 20 from the buttering hopper 21, and thus is coated over the entire surface with butter 20. The material pieces 2" which have been buttered in this way, are allowed to fall from the end of the buttering conveyer 10", which is inclined with respect to the direction of progress of the covering conveyer 12, from the head portion first onto the covering conveyer 12, as shown in FIGS. 8, 9 and 11. The buttered material 2" thus rests on flour 36 held uniform by the divider 35 and proceeds in parallel posture in the longitudinal direction of the covering conveyer 12. As the material 2" proceeds on the covering conveyer 12, it is covered with flour 36 in an overhanging fashion from the opposite sides. At this time, the flour 36 is regulated by the flour gathering disks 38 and attached to the material 2" in a squeezed fashion. Further, as shown in FIGS. 13 and 14, the buttered material 2" receives urging forces on its opposite sides by the covering conveyer 12 made progressively closer to it by the urging rollers 37, while it receives a soft urging force provided from above by the developing rollers 42. Further, it receives a reaction force from below. Thus, the material 2" is covered with flour 36 entirely, uniformly in thickness and reliably with covering pressure applied from above and below and also from the opposite sides. Rough or gritty covering thus can be obtained. The material 2" which has thus been covered, is transferred form the end of the covering conveyer 12 to the returning conveyer 43 and sieving conveyer 61.

Concurrently, on the covering conveyer 12 the last stage buttering conveyer 10" of the buttering section 4 sharply turns back for retreat. Thus, the excess butter 20 which has not been used for the buttering is returned via the receiving shoot 33 to the surge tank 25 and does not remain on the covering conveyer 12. Thus, the flour 36 on the covering conveyer 12 is not given moisture due to butter 20. Further, no butter 20 is a cause of lamps is provided. Thus, on the covering conveyer 12 the sole flour 36 is conveyed together with the buttered material 2". At this time, the amount of flour 36 on the covering conveyer 12 is monitored by the level sensors 39 and 40 for their high and low levels. When the low level is detected, a damper (not shown) of the flour hopper 41 is opened, whereby a constant amount of flour 36 is supplies at all times via the grains powder conveyer 56 and chute 57 to the covering conveyer 12.

On the grains powder conveyer 56, the recovered flour and supplied flour 36 are sterilized by the sterilizing unit to be held sanitary.

Of course during this time, the flour 36 that has been separated from lamps 56 and 56' and re-circulated via the string conveyers 54 and 54' in the returning conveyer 43, the sieving conveyer 61, the reverse feed type receiving belt conveyer 63 and the receiving belt conveyer 49, is effectively utilized.

The food material 2" for frying which has been transferred from the sieving conveyer 61 to the twisting conveyer 64, is rotated sidewise at least once on the twisting plate 65 due to the progressive leftward inclination in the Figure of the twisting conveyer 64 with respect to the progress direction thereof. Thus, complete finish covering with flour 36 in a rough or gritty state with respect to the butter 20 is obtained, in which exposure of butter 20 is eliminated. The material 2" which is thus covered is then conveyed to the packaging conveyer 71 for the next stage conveyer 62 to be progressively and neatly put on each tray 69 supplied from the tray feeder 68 before being conveyed to the next freezing step.

The sequence of operations described above is carried out continuously and entirely automatically while the material pieces 2", comprising shelled meat with trail portion, are supplied to the buttering conveyer 10.

The supply of butter 20 to the surge tank 25 is done adequately. To avoid its viscosity increase due to temperature rise, the butter 20 is cooled by supplying cooling water, for instance ice water, to the jacket 24.

The form of carrying out the invention of the present application is of course not limited to the above embodiment, and various changes and modifications are possible. For example, a vibrator may be provided at an intermediate portion of the covering conveyer to provide for more effective pressure application covering action. Further, the sieving section may be vibrated to permit readier sieving.

Further, the invention is applicable not only to fried shrimps or crab portions but also to various other fried foods.

In design changes, it is possible to use other grains powder than flour, for instance corn powder.

[EFFECTS OF THE INVENTION]

As has been described in the foregoing, the invention of the present application concerns the manufacture of food material for frying to produce fried shrimps or crab portions. Specifically, in a process, in which row food material having been shelled is buttered and then covered with flour or like grains powder, primary covering of the entire surface of the food material is done, in which the material is covered over the entire surface with grains powder by light pressure application covering to obtain a rough or gritty covering. Then, the food material is turned sidewise with respect to the progress direction, whereby a soft of complete finish covering action is brought about with respect to the flour or like grains powder in the covering on the food material. Thus, in case when covering fails to be produced on a very small part of the material surface, the finish covering that is effected with the sidewise turning of the material has an effect of eliminating any exposed butter portion. It is thus possible to eliminate such undesired state as blackening in home cooking or the like.

In the buttering process, the raw food material is heated in the steamer for sterilization, so that it can be held sanitary in the covering process. In addition, it is possible to prevent the emission of the water-soluble delicious content in the shelled meat, thus preventing the deterioration of the taste of the food.

The buttered food material for frying is thrown onto the grains powder supply conveyer. Thus, the material pieces are held in a neat parallel posture on the covering conveyer in the progress direction thereof, and the covering can be obtained accurately.

The buttering conveyer is used to supply the raw food material to the covering conveyer. The raw food material such as shelled meat portion with tail is thus supplied continuously. At this time, since the buttering conveyer is a string conveyer extending beneath the nozzle of the buttering hopper and over the covering conveyer, the material can be uniformly coated with butter falling from the buttering tank. Further, excess butter resulting in the buttering is immediately attached to the string conveyer due to its viscosity to be retreated and recovered in the buttering tank via the receiving shoot and the like. Thus, no butter is introduced to the flour or like grains powder on the covering conveyer. Thus, the possibility of provision of moisture to the grains powder to result in defective attachment is eliminated. In addition, no lamps are formed after the processing.

Further, the ends of a plurality of string conveyers of the last stage buttering conveyer lie on a line which is inclined with respect to he progress direction of the covering conveyer. The buttered material thus falls from its head portion onto the covering conveyer to be conveyed in a posture extending in the progress direction of the covering conveyer. Thus, the buttered material can be reliably covered over the entire surface by pressure application covering.

Further, in the excursion process of recovering grains Powder separated from the food material after the buttering, sterilization is provided to sterilize bacteria that are liable to be introduced in the recycle process. It is thus possible to maintain the process food material sanitary.

Further, while butter is supplied continuously to the buttering hopper via the shoot by the disk pump provided on the buttering Hopper in the buttering process, the overflowing butter is re-circulated to the surge tank. Thus, while pumping action is provided, a sort of stirred state is maintained to hold a constant butter viscosity at all times. The food material for frying supplied from the buttering conveyer to the grains powder supply conveyer has been buttered under constant conditions at all times. Thus, the food material fed out from the grains powder supply conveyer has been covered uniformly in thickness with grains powder in a commonly termed rough or gritty state. The product thus has high accuracy, and it is possible to improve reliability of the product.

While the buttered food material is covered with grains powder sidewise by the urger on an intermediate portion of the covering conveyer, it receives a soft urging pressure applied to it from above by the developing rollers. Thus urging pressure, along with a reaction force from below, permits covering the buttered food material over the entire surface thereof with grains powder such that the eventual food provides a light soft touch to the tongue. Besides, as noted above, it is possible to obtain a rough or gritty covering with satisfactory appearance. Further, a soft sense to the tongue just like that obtainable by manual operation of grains powder covering is obtainable. When eating the food, a light touch to the tongue and delicious taste can be obtained. Thus, improved commercial value can be obtained.

Since the urger provided on the opposite sides of the covering conveyer is constituted by crown-type urging rollers. The covering conveyer is made round from its sides, and thus it is possible to obtain pressure application covering of the buttered food material over the entire circumference thereof.

Further, the developing rollers, which are provided between the opposite side urging rollers and accommodate a predetermined weight material, provides the same function as the pressure application covering of the buttered food material with grains powder by manual operation. The soft taste noted above thus can be provided.

Further, with the twisting conveyer that is provided in the sieving conveyer provided as a stage subsequent to the covering conveyer, the covered food material can be turned sidewise at least once before it is transferred to the next stage. The sidwise turning of the food material adds to the reliability of covering of the entire surface of the material with grains powder that has been done by pressure application covering by the urger and developing rollers. The grains powder thus is attached reliably over the entire surface. The food material is thus free from any portion with exposed butter. Thus, discolored portion does not result in the final stage of frying, and it is possible to maintain sufficient appearance of the food.

Further, since grains powder level sensors are provided on an intermediate portion of the covering conveyer, an optimum amount of grains powder can be supplied to the covering conveyer when covering the buttered food material. Covering thus can be effected as designed.

The buttering of the shelled material portion for fried food such as fried shrimps thus can be done reliably. Besides, in the subsequent covering no butter is introduced into grains powder. Further, no lamps are produced, and the entire food material surface uniformly coated with butter is covered with grains powder in a rough or gritty state. Further, the urging and developing rollers add to the softness of covering, so that appearance and taste just like those in case of the manual preparation can be obtained.

Moreover, since the processing is done continuously as mechanical operation, it is possible to supply food material for frying in large quantities in a mass production system, thus permitting cost reduction and stable distribution in markets.

What is claimed is:

1. An apparatus for coating food pieces with grains powder, the food pieces to be fried, the apparatus comprising:

a buttering conveyor for accepting thereonto and conveying the pieces and including a buttering conveyor dropoff end, the buttering conveyor further comprising a first string conveyor;

a steamer, through which the buttering conveyor is disposed, for steaming the pieces;

a batter hopper;

a nozzle fed with batter from the batter hopper, the nozzle being disposed over the buttering conveyor such that the pieces are coated with the batter;

a covering conveyor, the covering conveyor having a covering conveyor discharge end and a stem portion disposed under the buttering conveyor dropoff end in such a position that the pieces fall from the buttering conveyor dropoff end onto the stem portion of the covering conveyor;

a conveyor urger disposed at an intermediate portion of the covering conveyor;

a sieving conveyor adjacent the covering conveyor discharge end, the sieving conveyor further comprising a second string conveyor;

a next-stage output conveyor for accepting the pieces from the sieving conveyor;

a grains powder supply conveyor coupled to the stem portion of the covering conveyor; and a grains powder recovery coveyor extending between the covering conveyor and the sieving conveyor and coupled to the covering conveyor stem portion.

2. The apparatus according to claim 1, wherein said buttering conveyer has an end portion with the length thereof reduced stepwise in the direction of progress of said covering conveyer.

3. The apparatus according to claim 1, wherein said steamer includes a casing and a steaming tube extending through said casing along said string conveyer.

4. The apparatus according to claim 1, wherein said butter hopper includes a receiving shoot disposed beneath said nozzle.

5. The apparatus according to claim 1, wherein said grains powder recovery conveyer includes a third string conveyer in an upstream portion and further includes a sterilizing unit disposed adjacent a grains powder carrying surface thereof.

6. The apparatus according to claim 5, wherein said sterilizing unit includes a lamp emitting selectively ultraviolet rays and, far infrared rays.

7. The apparatus according to claim 5, wherein said sterilizing unit is provided at a stem end of said grains powder recovery conveyer.

8. The apparatus according to claim 1, wherein said conveyer urger includes a plurality of crown-shaped urging rollers disposed outside a flexible conveying belt said covering conveyer.

9. The apparatus according to claim 1, wherein said conveyer urger includes a cone-shaped inclined gathering disk disposed inside said covering conveyer.

10. The apparatus according to claim 1, wherein said conveyer urger includes an upper horizontally rotatable developing roller.

11. The apparatus according to claim 10, wherein said developing roller includes weight material.

12. The apparatus according to 10, wherein said developing roller further includes a parallel plurality of developing rollers disposed along a direction of progress of the pieces.

13. The apparatus according to claim 1, which further comprises a twisting conveyer disposed between said sieving conveyer and said next-stage output conveyer.

14. The apparatus according to claim 13, wherein said twisting conveyer is constituted by a plurality of fourth string conveyers.

15. The apparatus according to claim 13, wherein said twisting conveyer is a flat belt conveyer.

16. The apparatus according to claim 7, further comprising a grains powder level sensor provided at an intermediate portion of said covering conveyer.

17. The apparatus according to claim 16, wherein said level sensor is electrically connected to a damper of a grains powder hopper.

18. The apparatus according to claim 16, wherein said level sensor is provided between adjacent ones of a plurality of urgers.

19. The apparatus according to claim 16, wherein said level sensor is disposed in a developer.

20. The apparatus according to claim 1, further comprising a disk pump connected to said buttering hopper.

21. The apparatus according to claim 20, further comprising a plurality of disks slidable along a guide pipe provided on said disk pump and coupled to a drive sprocket.

22. The apparatus according to claim 20, further comprising a chute provided between said disk pump and said buttering hopper.

* * * * *